United States Patent
Pozin et al.

(10) Patent No.: US 7,763,385 B2
(45) Date of Patent: *Jul. 27, 2010

(54) ZINC/AIR CELL

(75) Inventors: Michael Pozin, Brookfield, CT (US); Nikolai Nikolaevich Issaev, Woodbridge, CT (US)

(73) Assignee: The Gillette Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,303

(22) Filed: Oct. 19, 2009

(65) Prior Publication Data

US 2010/0040936 A1   Feb. 18, 2010

Related U.S. Application Data

(62) Division of application No. 11/262,468, filed on Oct. 28, 2005, now Pat. No. 7,625,672.

(51) Int. Cl.
*H01M 4/42* (2006.01)
*H01M 10/26* (2006.01)
(52) U.S. Cl. ..................... 429/229; 429/207
(58) Field of Classification Search .............. None
See application file for complete search history.

(56) References Cited

U.S. PATENT DOCUMENTS

| 3,532,552 | A | | 10/1970 | Cohen et al. | |
|---|---|---|---|---|---|
| 3,897,265 | A | | 7/1975 | Jaggard | |
| 5,279,905 | A | | 1/1994 | Mansfield | |
| 5,721,068 | A | * | 2/1998 | West et al. | 429/300 |
| 6,602,629 | B1 | | 8/2003 | Guo | |
| 6,830,847 | B2 | | 12/2004 | Ramaswami | |
| 2003/0077512 | A1 | | 4/2003 | Charkey et al. | |
| 2005/0003271 | A1 | | 1/2005 | Jiang | |

FOREIGN PATENT DOCUMENTS

JP   2004 063345 A   2/2004
WO   WO 03/034531 A1   4/2003

* cited by examiner

*Primary Examiner*—Dah-Wei D Yuan
*Assistant Examiner*—Maria J Laios
(74) *Attorney, Agent, or Firm*—Vladimir Vitenberg; Kevin Johnson

(57) ABSTRACT

A zinc/air depolarized cell wherein the anode comprises zinc particles, aqueous alkaline electrolyte, and pyrophosphate based $(P_2O_7)^{4-}$ additive. The cell may be in the form of a button cell. The addition of a pyrophosphate containing additive to the zinc anode improves the cell's service life regardless of whether the zinc is amalgamated with mercury or contains zero added mercury. The pyrophosphate based on $(P_2O_7)$ content preferably comprises between about 0.001 and 2 percent by weight of the anode.

7 Claims, 2 Drawing Sheets

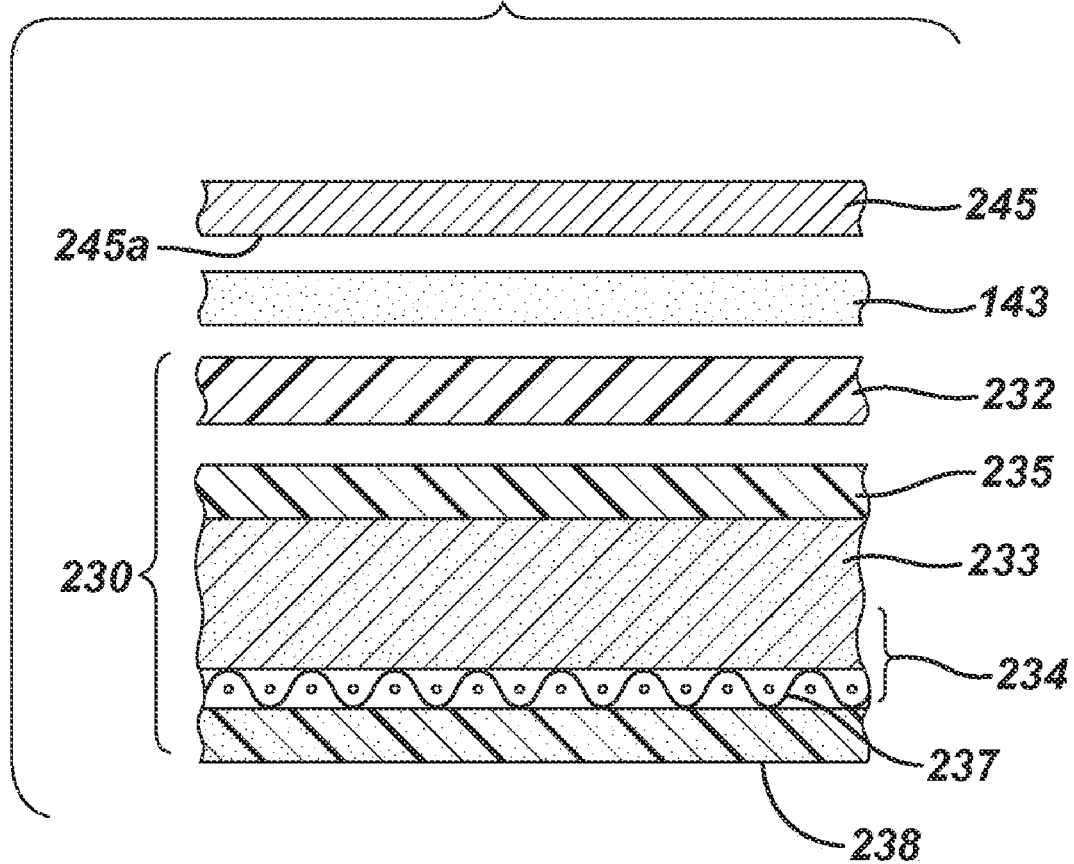

ZINC/AIR CELL

CROSS REFERENCE TO RELATED APPLICATION

This application is a divisional of U.S. patent application Ser. No. 11/262,468, filed Oct. 28, 2005 now U.S. Pat. No. 7,625,672.

FIELD OF THE INVENTION

The invention relates to a metal/air cell preferably having an anode comprising zinc and an air cathode. The invention relates to the addition of a pyrophosphate $(P_2O_7)^{4-}$ containing compounds (soluble or insoluble) to anodes of a metal/air cell having an anode comprising zinc particles and alkaline electrolyte.

BACKGROUND

Zinc/air depolarized cells are typically in the form of miniature button cells which have particular utility as batteries for electronic hearing aids including programmable type hearing aids. Such miniature cells typically have a disk-like cylindrical shape of diameter between about 4 and 20 mm, typically between about 4 and 16 mm and a height between about 2 and 9 mm, preferably between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode can), and a cathode casing (cathode can). The anode casing and cathode casing each have a closed end an open end and integral side walls extending from the closed end to the open end. The anode casing is fitted with an insulating seal ring which tightly surrounds the anode casing side wall. Anode material is inserted into the anode casing. Air diffuser, electrolyte barrier material, and cathode assembly are inserted into the cathode casing adjacent air holes in the cathode casing. After the necessary materials are inserted into the anode and cathode casings, the open end of the cathode casing is typically pushed over the open end of the anode casing during assembly so that a portion of the cathode casing side walls covers a portion of the anode casing side wall with insulating seal therebetween. The anode and cathode casing are then interlocked in a second step by crimping the edge of the cathode casing over the insulator seal and anode casing. During the crimping procedure (or in a separate step) radial forces are also applied to the cathode casing walls to assure tight seal between the anode and cathode casings.

The anode casing of zinc/air button cells may be filled with an anode mixture comprising particulate zinc. Typically, the anode mixture contains mercury, which is amalgamated with the zinc particles. The mercury typically comprises between about 2 and 5 percent by weight based on the weight of zinc. The presence of mercury in the anode improves the zinc interparticle conductivity and reduces cell gassing. The anode mixture also contains a small amount of a gelling agent and the zinc particles become gelled when electrolyte is added to the mixture. Alternatively, the anode mixture may be mercury free, that is, containing no added mercury. In such case added care must be taken to seal the cell tightly due to the somewhat increased gassing, which can be expected. The electrolyte is conventionally an aqueous solution of potassium hydroxide. The closed end of the cathode casing (when the casing is held in vertical position with the closed end on top) may have a flat raised portion near its center. This raised portion forms the positive terminal and typically contains a plurality of air holes therethrough. In this design, the cathode casing closed end also typically has an annular recessed step which surrounds the raised positive terminal. Alternatively, the closed end of the cathode casing may be completely flat across its diameter, that is, without any raised portion at its center. In such design the central portion of such flat area at the closed end of the cathode casing typically forms the cell's positive terminal. In either case, the closed end of the cathode casing of button zinc/air cells is punctured with one or more small air holes to allow air to enter the cell. Such air then traverses an air diffusion layer (or air diffuser) in order to reach the cathode disk.

The air diffuser material is normally composed of one or more sheets of air permeable paper or porous cellulosic material. Such permeable paper or porous cellulosic material allows incoming air to pass uniformly to the cathode assembly and also may serve as a blotter to absorb minor amounts of electrolyte which may leak into the air inlet space. The air diffuser is normally placed first within the cathode casing against the closed end of the cathode casing so that it abuts the air holes. The air diffuser material fills such air inlet space and covers the air holes in the closed end of the cathode casing. Commercial button size zinc/air cells which are commonly used in hearing aid devices may have only one air hole or may have a plurality of small air holes, for example, between 2 and 6 air holes and even more depending on cell size.

Catalytic material typically comprising particulate manganese dioxide (or mixture of various manganese oxides), carbon, and hydrophobic binder can be compacted into a disk shape forming a cathode disk within a cathode assembly. The cathode assembly with cathode disk therein can then be inserted into the cathode casing over the air diffuser on the side of the air diffuser that faces away from the air holes. Typically a cathode assembly is formed by laminating a layer of electrolyte barrier material (hydrophobic air permeable film), preferably Teflon (polytetrafluoroethylene), to one side of the catalytic cathode facing the air diffuser and an electrolyte permeable (ion permeable) separator material to the opposite side of the catalytic cathode disk.

The cathode assembly may have a flat or domed shape. The flat cathode assemblies are preferred, since they are easier and more economical to fabricate. Representative zinc/air button cells with flat cathode assemblies are shown in U.S. Pat. No. 5,279,905; U.S. Pat. No. 6,602,629 B1; and U.S. Pat. No. 6,830,847 B2.

If the cell is not adequately sealed, electrolyte can migrate around the catalytic cathode assembly and leak from the cathode casing through the air holes. Also electrolyte leakage can occur between the crimped edge of the cathode can and insulator if this area is not tightly sealed. The wall thickness of commercial zinc/air button cells are typically greater than about 6 mil (0.152 mm), for example, between about 6 and 15 mil (0.152 and 0.381 mm). The potential for leakage is greater when the anode casing and cathode casing is of very thin wall thickness, for example, between about 2 and 5 mil (0.0508 and 0.127 mm). Such low wall thickness is desirable, since it results in greater internal cell volume.

After the cell is assembled a removable tab is placed over the air holes on the surface of the cathode casing. Before use, the tab is removed to expose the air holes allowing air to ingress and activate the cell.

It is desirable to improve performance of the zinc/air cell regardless of whether mercury is added to the anode or whether the cell is mercury free, that is, contains no added mercury.

It is desirable to improve the service life of the zinc/air cell, under normal usage conditions, without promoting cell leakage.

SUMMARY OF THE INVENTION

The invention is directed to primary, non rechargeable zinc/air cells, particularly miniature zinc/air cells in the form of button cells. Such miniature button cells typically have a cathode can and an anode can. There is at least one air hole, typically a plurality of air holes running through the closed end of the cathode can. After the anode and cathode components are inserted into the respective cans, the cathode can side walls are crimped over the cathode can side walls with insulator material therebetween.

The miniature zinc/air button cell of the invention typically has a disk-like cylindrical shape of overall diameter between about 4 and 20 mm, typically between about 4 and 16 mm, and a overall height between about 2 and 9 mm, preferably between about 2 and 6 mm. The zinc/air cells may have anode can and cathode can wall thickness, typically covering a range between about 2 mil and 15 mil (0.0508 and 0.381 mm). Desirably, the zinc/air cells may have thin anode can and cathode can walls of thicknesses between about 2.0 and 5 mils (0.0508 and 0.127 mm). These wall thicknesses may apply to the thickness of a single layer (unfolded) anode and cathode can side wall and also the thickness of the closed end of the anode and cathode can. When the anode can wall thicknesses are very thin, that is, approaching the lower limit of the above wall thickness ranges, it is preferred to have the anode can side wall once folded in effect forming a double side wall. In such embodiment it will be appreciated that the above wall thickness ranges apply to each one of the double side walls.

In an aspect of the invention the anode of a zinc/air cell includes a compound containing pyrophosphate which may be represented in ionic (disassociated) form when in solution as $(P_2O_7)^{4-}$ in amount (ionic form) desirably between about 0.001 and 2 percent by weight of the anode, preferably between about 0.003 and 1 percent by weight of the anode. It will be understood that any reference to pyrophosphate based additive $(P_2O_7)^{4-}$ herein and in the claims includes the ionic form $P_2O_7^{4-}$ when it is in soluble (dissociated) state as well as when not in dissociated state. For example, the term pyrophosphate based additive $(P_2O_7)^{4-}$ as used herein applies to potassium pyrophosphate $(K_4P_2O_7)$ which is very soluble in water and also applies to calcium pyrophosphate $(Ca_2P_2O_7)$ which has relatively low solubility in water (substantially insoluble in water). Thus the term pyrophosphate $(P_2O_7)^{4-}$ as used herein and in the claims is intended to apply to soluble, partially soluble, and substantially insoluble pyrophosphates.

A compound containing pyrophosphate $P_2O_7^{4-}$ is available in the form of acid $H_4P_2O_7$; alkali metal pyrophosphate or alkali earth metal pyrophosphate, and mixtures thereof. The alkali metal pyrophosphate, for example, may be a potassium $K_4P_2O_7$, sodium $Na_4P_2O_7$, or lithium $Li_4P_2O_7$ pyrophosphates and mixtures thereof. The alkali earth metal pyrophosphate may be a magnesium $Mg_2P_2O_7$, calcium $Ca_2P_2O_7$, strontium $Sr_2P_2O_7$, or barium $Ba_2P_2O_7$ pyrophosphate and mixtures thereof. Additionally, the pyrophosphate may be a salt of tellurium pyrophosphate $Tl_4P_2O_7$, or tetrabutylammonium pyrophosphate $[(C_4H_9)_4N]_4P_2O_7$ or any mixture thereof. A preferred pyrophosphate is potassium pyrophosphate, which is available as colorless crystals or a white powder. It is somewhat hydroscopic and its full chemical formula is normally presented as $K_4P_2O_7 \cdot 3H_2O$, while anhydrous form $K_4P_2O_7$ also can be obtained. The zinc/air cell anode of the invention herein comprising a compound containing pyrophosphate additive has a zinc/electrolyte weight ratio desirably between about 3.0 and 5.0, preferably between about 3.3 and 4.9, more preferably between about 4.0 and 4.9, wherein the electrolyte preferably comprises potassium hydroxide (KOH) in concentration between about 30 and 40 wt. %, preferably between about 33 and 40 wt. %. (If the zinc is amalgamated with mercury the weight of zinc is understood to include the mercury.)

In one aspect the zinc/air cell anode of the present invention, which includes a compound containing a pyrophosphate $(P_2O_7)^{4-}$ additive, may also contain added mercury which is amalgamated with the zinc particles. In this case the anode typically contains between about 2 and 5 wt. % mercury based on the weight of zinc, preferably about 3 wt. % mercury based on the weight of zinc. Alternatively, the anode of the present invention may contain zero added mercury (mercury content less than 100 ppm based on the weight of zinc, typically less than 40 ppm based on weight of zinc).

In another aspect the zinc/air cell anode of the present invention desirably comprises between about 77 and 83 wt. % zinc particles (which may or may not be amalgamated with mercury) and between about 17 and 23 wt. % aqueous alkaline electrolyte, wherein the alkaline electrolyte desirably comprises potassium hydroxide (KOH) in concentration between about 30-40 wt. %, desirably between about 33-40 wt. % of the electrolyte. The zinc particles may also be alloyed with between about 100 and 1000 ppm indium and optionally with between about 100 and 1000 ppm lead. Desirably, the compound containing pyrophosphate $(P_2O_7)^{4-}$ additive is brought into the anode by way of the electrolyte. The aqueous alkaline electrolyte comprises between about 0.004 and 12 percent by weight of pyrophosphate $(P_2O_7)^{4-}$ additive, preferably between about 0.012 and 6 percent by weight of pyrophosphate component. In a preferred embodiment the anode comprises between about 77 and 83 percent by weight zinc particles and correspondingly between about 17 and 23 percent by weight alkaline electrolyte. Thus, in such case the pyrophosphate $(P_2O_7)^{4-}$ additive comprises between about 0.001 and 2 percent by weight of the anode, preferably between about 0.003 and 1 percent by weight of the anode.

The addition of the above small amounts of pyrophosphate $(P_2O_7)^{4-}$ containing compound to the anode of zinc/air cells will results in an increase in discharge service life (hours) of the zinc/air cell in normal usage, regardless of whether the zinc particles are amalgamated with mercury or the cell is essentially mercury free, that is, contains zero added mercury.

BRIEF DESCRIPTION OF THE DRAWINGS

The invention will be better understood with reference to the drawings in which:

FIG. 2 is an exploded view of a preferred embodiment of the catalytic cathode assembly shown in FIG. 1.

DETAILED DESCRIPTION

Figure 1:
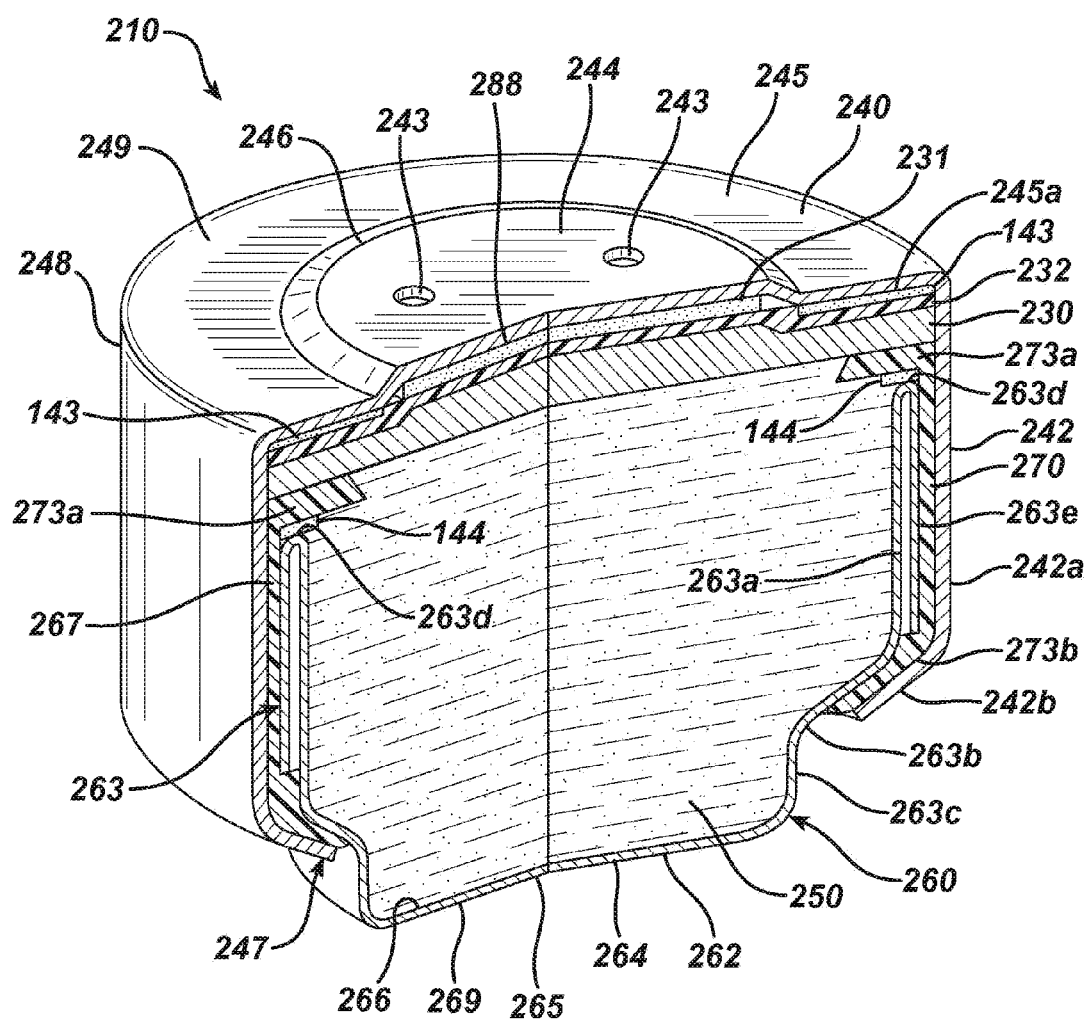
FIG. 1 is an isometric cross sectional view of an embodiment of the zinc/air cell of the invention employing pyrophosphate containing additive in the anode.

The invention is directed principally to primary, non rechargeable air depolarized electrochemical cells. Such cells have a metal anode, typically comprising zinc within an anode casing, and there is an air inlet to the cathode material within the cathode casing. The cell is commonly referred to as a metal/air or air-depolarized cell, and more typically a zinc/air cell.

The primary zinc/air cell of the invention, which includes pyrophosphate containing additive in the anode, is desirably in the form of a miniature button cell. A representative preferred embodiment of the cell is shown in FIGS. 1 and 2. Cell 210 has an anode casing (anode can) 260 with anode mixture 250 therein. Cell 210 has a cathode casing (cathode can) 240 which includes a cathode assembly 230 containing catalytic cathode material 233 therein. Each of the anode casing 260 and cathode casing 240 have a closed end and opposing open end with integral side wall therebetween. The cathode material 233 is placed in proximity to air holes 243 in the closed end 249 of the cathode casing 240. The cathode casing 240 has an open end 247 which is inserted over the open end 267 of the anode casing 260 with insulating material 270 therebetween. The zinc/air cell has particular application as a power source for small electronic devices such as hearing aids. But such cells may also be used to power other electronic devices. The miniature zinc/air button cell of the invention typically has a disk-like cylindrical shape of diameter between about 4 and 20 mm, for example, between about 4 and 16 mm, preferably between about 4 and 12 mm. The miniature zinc/air button cell has a height between about 2 and 9 mm, preferably between about 2 and 6 mm. The miniature zinc/air cell typically has an operating load voltage between about 1.2 Volts to 0.2 Volts. The cell typically has a substantially flat discharge voltage profile between about 1.1 and about 0.9 Volts whereupon the voltage can then fall fairly abruptly to zero. The miniature zinc/air cell can be discharged at a rate usually between about 0.2 and 25 milliAmperes. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells and even larger.

The cell of the invention may contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 100 parts per million parts by weight of zinc, preferably less than 40 parts per million parts (ppm) by weight of zinc, more preferably less than about 20 parts per million parts by weight of zinc. (The term "essentially mercury free" as used herein shall mean the cell has a mercury content less than about 100 parts per million parts by weight of zinc.) The cell of the invention can have a very small amount of lead additive in the anode. If lead is added to the anode, the lead content in the cell can typically be between about 100 and 1000 ppm of zinc in the anode. However, the cell desirably does not contain added amounts of lead and thus can be essentially lead free, that is, the total lead content is less than 30 ppm, desirably less than 15 ppm of zinc in the anode.

It has been determined that the primary, non rechargeable zinc/air cell 210 as shown in a representative configuration (FIG. 1) can exhibit improved performance, if small amounts of pyrophosphate $(P_2O_7)^{4-}$ containing compound, for example (but not limited to) potassium pyrophosphate $K_4P_2O_7$ is added to the anode material 250. The improvement to service life is obtained regardless of whether mercury is added to the anode. That is, the addition of the pyrophosphate containing compound improves service life in a zinc/air cell 210 in which zinc is amalgamated with mercury, typically 2-5 wt. % mercury based on the weight of zinc particles, as well as the same cell without any added mercury. Specifically, it has been determined that the cell's service life may be extended under normal usage conditions, for example, as a power source for a hearing aid, if the pyrophosphate containing compound is added to the anode material, which may or may not contain added mercury.

In a preferred embodiment the pyrophosphate can be added in the form of a potassium salt, e.g. potassium pyrophosphate $(K_4P_2O_7)$. Potassium pyrophosphate additive is available as a colorless crystal or white powder which is somewhat hydroscopic in air. The full formula may be represented typically as $K_4P_2O_7.3H_2O$. Potassium pyrophosphate can also exist in anhydrous state as $K_4P_2O_7$ Potassium pyrophosphate may also be referenced as tetrapotassium pyrophosphate. Potassium pyrophosphate has a Sp.Gr. of about 2.33 and is soluble in water and insoluble in alcohol. It has a low toxicity. Potassium pyrophosphate in anhydrous state is available from Aldrich Co.

The anode mixture 250 for a fresh (not discharged) zinc/air cell 210 comprises zinc particles, aqueous alkaline electrolyte and small amount of gelling agent. The term "fresh" as used herein shall be understood to mean the cell condition before it is used in service. The zinc particles may be amalgamated with mercury. The zinc particles may desirably be alloyed with indium (100-1000 ppm based on zinc) to improve conductivity and suppress gassing. Small amounts of lead (100-1000 ppm based on zinc) may optionally also be added to the anode material. The aqueous electrolyte is typically an aqueous solution of potassium hydroxide (KOH concentration between about 30-40 wt. % and 2 wt. % ZnO.) It has been found to be convenient to blend in a soluble pyrophosphate containing compound into the aqueous alkaline solution before it is admixed with the zinc particles and gelling agent. However, the pyrophosphate containing compound may be added to a mixture of zinc particles and aqueous electrolyte or to the mixture of zinc particles. In case pyrophosphate containing compound is added to the mixture of zinc particles it can be added as a soluble compound (for example $K_4P_2O_7$) or partially soluble compound (for example $Ca_2P_2O_7$). In either case, as above mentioned, the term pyrophosphate $(P_2O_7)^{4-}$ as used herein and in the claims is intended to apply to soluble, partially soluble, and substantially insoluble pyrophophates. (Even when substantially insoluble phyrophosphates such as $Ca_2P_2O_7$ is added to the anode, additional amounts of $(P_2O_7)^{4-}$ ions become dissociated from the calcium to replace those that have been consumed in order to maintain chemical equilibrium in solution.) The anode mixture 250 in keeping with the present invention desirably comprises between about 0.001 and 2 wt. %, preferably between about 0.003 and 1 wt. % of pyrophosphate based compound where the above contents is based on content of $P_2O_7$—. The completed anode composition desirably has a zinc/electrolyte weight ratio between about 3.0 and 5.0, preferably between about 3.3 and 4.9, more preferably between about 4.0 and 4.9. In all cases the concentration of KOH in the aqueous electrolyte is between about 30 and 40 wt. %, preferably between about 33 and 40 wt. %.

It is not known with certainty why the addition of small amounts of pyrophosphate $(P_2O_7)^{4-}$ containing compound to the anode mixture 250 the zinc/air cell results in an improvement in the discharge service life of the cell. While not being bound to any particular theory, the following mechanism is postulated.

On the cathode side the incoming oxygen is reduced by the following reaction consuming electrons:

$$\tfrac{1}{2}O_2 + H_2O + 2e = 2[OH]^- \qquad \text{Eq. 1}$$

On the anode side the zinc particle are oxidized releasing electrons:

$$Zn - 2e = Zn^{+2} \qquad \text{Eq. 2}$$

$$Zn^{+2} + 2[OH]^- = Zn[OH]_2 \qquad \text{Eq. 3}$$

$Zn[OH]^2$ is a precipitant. At the excess of electrolyte, that is at excess of KOH, the $Zn[OH]_2$ dissolves with generation of soluble zincate complex ions:

$$Zn[OH]_2 + 2[OH]^- = [Zn(OH)_4]^{-2} \qquad \text{Eq. 4}$$

As the cell discharges, especially with limited KOH and low water in the system, that is, especially at elevated zinc/electrolyte ratio, the reaction (Eq. 4) ceases. Reaction (Eq. 3) proceeds and the $Zn[OH]_2$ starts to decompose to ZnO and $H_2O$ as follows:

$$Zn[OH]_2 = ZnO + H_2O \qquad \text{Eq. 5}$$

Thus, the overall reaction for the cell may be obtained by adding reactions 1,2,3, and 5 to yield.

$$Zn + \tfrac{1}{2}O_2 = ZnO \qquad \text{Eq. 6}$$

The buildup of insoluble ZnO gradually deposits on the surface of the zinc particles and accumulates as a solid core within the cell. The buildup of ZnO slows reaction kinetics, passivates unreacted zinc particles, and eventually results in a shut down of the cell.

It is believed that the addition of pyrophosphate $P_2O_7^{4-}$ containing compound to the anode, even in small amounts, desirably between about 0.001 and 2 percent by weight of the anode, preferably between about 0.003 and 1 percent by of the anode mixture based on content of $(P_2O_7)$, results in interceding reactions which retards the rate of formation of precipitates such as ZnO. This thereby extends the service life of the cell. The zinc/electrolyte weight ratio in the anode may typically be between about 3.0 and 5.0, preferably between about 3.3 and 4.9, more preferably between about 4.0 and 4.9, wherein the electrolyte has a KOH concentration between about 30 and 40 wt. %, preferably between about 33 and 40 wt. %.

The zinc/air cell 210 of the invention (FIG. 1), which includes pyrophosphate $(P_2O_7)^{4-}$ additive in the anode mixture 250, has an anode casing 260, a cathode casing 240 and electrical insulator material 270 therebetween. The anode casing 260 and cathode casing 240 are preferably each in the form of a can or cup having a closed end and opposing open end. The anode casing 260 has body 263 forming the side walls, an integral closed end 269, and an open end 267. The cathode casing 240 has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion to the outer peripheral edge 248.

The anode casing 260 (anode can) contains an anode mixture 250 comprising particulate zinc, an aqueous alkaline electrolyte, and pyrophosphate additive. The particulate zinc is desirably alloyed with between about 100 and 1000 ppm indium. The zinc particles may also be plated with additional indium, preferably between about 100 and 1500 ppm indium. The cathode casing 240 has a plurality of air holes 243 in the raised portion 244 of its surface at the closed end thereof. A cathode catalytic assembly 230 containing a catalytic composite material 234 (FIG. 2) is placed within the casing proximate to the air holes. The catalytic composite 234 comprises a catalytic cathode mixture 233 in the form of a disk coated on a screen 237. During cell discharge, the catalytic material 233 facilitates the electrochemical reaction with ambient oxygen as it ingresses through air holes 243. An adhesive sealant 143 is applied along a portion of the inside surface of cathode casing 240. In a preferred embodiment the adhesive can be applied as a continuous ring on the inside surface 245a of recessed annular step 245 at the closed end 249 of the casing as shown in FIG. 1 and as also described in U.S. Pat. No. 6,436,156 B1. If the closed end of the cathode casing is flat, that is, does not have a recessed step 245, the adhesive sealant 143 can be applied to the inside surface of the closed end 249 adjacent the outer peripheral edge 248 of said closed end. In such latter case the adhesive sealant 143 is desirably applied as a continuous ring to the inside surface of closed end 249 such that the continuous ring of adhesive 143 has an outside diameter of between about 75 percent and 100 percent, preferably between about 90 and 100 percent, more preferably between about 95 and 100 percent of the inside diameter of closed end 249.

A representative cathode casing 240 (cathode can) is shown in FIG. 1. The cathode casing 240 is in the form of a can which has a closed end 249 and opposing open end 247 with body 242 (side walls) therebetween. The central portion 244 at the closed end 249 may be raised (as shown) and forms the positive terminal contact region. However, the entire closed end 249 may be flat, that is, without any raised central portion. There are one or more air holes 243 through the cathode casing closed end 249. There is an air inlet space 288 (plenum region) between the cathode casing closed end 249 and cathode assembly 230. Generally, the air inlet space 288 (plenum region) may be regarded as the available space between the inside surface of the cathode casing closed end 249 and cathode assembly 230 before any air diffuser material 231 is inserted therein. Conventionally, the air diffuser material is composed of air permeable paper or porous cellulosic material which is normally inserted to completely fill the available air inlet space 288.

In the embodiment shown in FIG. 1 there is a raised central portion 244 at the cathode casing closed end 249. In this embodiment (FIG. 1) the air inlet space 288 (plenum region) is the available space between the inside surface of the raised portion 244 of cathode casing closed end 249 and cathode assembly 230 before air diffuser material (or comparable) is inserted therein. (For the purposes of this description any electrolyte barrier sheet, such as electrolyte barrier sheet 232 on the cathode assembly 230, may be considered as part of the cathode assembly 230.) There are one or more air holes 243 through said raised portion 244. In a representative cathode casing 240, for example, for a 312 size cell having an outside diameter of between about 0.3025 and 0.3045 inches (7.68 and 7.73 mm) and a height of between about 0.1300 and 0.1384 inches (3.30 and 3.52 mm), there may typically be five equispaced air holes 243 each of diameter between about 0.010 and 0.012 inches (0.254 and 0.305 mm) through the raised portion 244 of the cathode casing closed end 249. However, it will be appreciated that there may be more air holes or as few as a single air hole depending on the size of the cell and size of the air hole, which may be somewhat more or less than the above specified hole size.

A cathode catalytic assembly 230 (FIGS. 1 and 2) can be formed by laminating a layer of hydrophobic electrolyte barrier film material 235, preferably Teflon (polytetrafluoroethylene), to one side of the catalytic composite material 234 and an ion permeable separator material 238 to the opposite side. The electrolyte barrier film 235, preferably of Teflon, has the property that it is permeable to air, yet keeps water and electrolyte from passing therethrough. The edge of cathode catalytic assembly 230 can be applied to said adhesive ring 143 on step 245 thereby providing a permanent adhesive seal between the cathode assembly 230 and casing step 245. The cathode catalytic assembly 230 can be applied to adhesive 143 on step 245 with the electrolyte barrier 235 contacting adhesive 143 directly. (Optionally an additional electrolyte barrier sheet 232 (FIGS. 1 and 2) may be overlaid on electrolyte barrier 235 and bonded to adhesive 143 as described in the following paragraph.) The use of adhesive sealant 143 also reduces the amount of crimping force needed during crimping the outer peripheral edge 242b over the anode casing body. This is particularly advantageous with thin walled anode and cathode casings 240 and 260 of wall thickness between about 0.001 inches (0.0254 mm) and 0.015 inches (0.38 mm), particularly with anode and cathode casing wall thicknesses between about 0.002 and 0.005 inches (0.0508 and 0.127 mm). The use of adhesive sealant 143 is also advantageous when thin catalytic cathode assemblies 230 are employed since high crimping forces could possibly distort or crack such thin casings and cathode assemblies.

In a preferred embodiment a separate electrolyte barrier sheet 232, preferably of Teflon, can be applied to adhesive ring 143 on the inside surface 245a of step 245, thereby bonding electrolyte barrier sheet 232 to the inside surface of step 245. The catalytic assembly 230 can then be applied over electrolyte barrier sheet 232, preferably with the surface of second electrolyte barrier sheet 235, preferably of Teflon, contacting the barrier sheet 232 (FIG. 2). In this embodiment the additional electrolyte barrier sheet 232 may be considered as part of the cathode assembly 230. The barrier sheet 232 when bonded to the inside surface 245a of step 245, particularly in combination with a second barrier sheet 235 (FIG. 2) being applied against barrier sheet 232, provides a very effective seal preventing electrolyte from migrating through or around the edge of catalytic assembly 230, filling blotter air diffuser material 231, and gradually leaking out of air holes 243. This preserves the air diffuser material 231, since there is little if any electrolyte leakage thereto. Conventional blotter air diffuser material 231 is of air permeable paper or porous cellulosic material which is inserted against the closed end 249 of the cathode casing 240 so that it covers air holes 243 and completely fills air inlet space 288.

A preferred embodiment of a complete zinc/air cell of the invention is shown in FIG. 1. The embodiment shown in FIG. 1 is in the form of a miniature button cell. The cell 210 comprises a cathode casing 240 (cathode can) an anode casing 260 (anode can) with an electrical insulator material 270 therebetween. The insulator 270 can desirably be in the form of a ring which can be inserted over the outside surface of the anode casing body 263 as shown in FIG. 1. A conventional water resistant sealing paste such as an asphalt or bitumen based sealant or polymeric sealant can be applied between the insulator 270 side wall and the anode casing outer wall 263e. The sealant (not shown) may be applied to the inside surface of insulator 270 wall before the insulator ring 270 is inserted over the anode can wall 263e. Insulator ring 270 desirably has an enlarged portion 273a extending beyond peripheral edge 263d of anode casing 240 (FIG. 1) forming an "L" shape configuration in cross section. The insulator 270 with enlarged portion 273a prevents anode active material from contacting the cathode casing 240 after the cell is sealed. Insulator 270 is of a durable electrically insulating material such as high density polyethylene, polypropylene or nylon which resists cold flow when squeezed.

The anode casing 260 and cathode casing 240 are initially separate pieces. The anode casing 260 and cathode casing 240 are separately filled with active materials, whereupon the open end 267 of the anode casing 260 can be inserted into the open end 247 of cathode casing 240. The anode casing 260 can have a folded side wall formed of a first outer straight body portion 263e which extends vertically upwards (FIG. 1) forming the casing 260 outer side walls. The straight body portion 263e may desirably be folded over once at edge 263d to form a first downwardly extending inner portion 263a of the anode casing side wall. The folded portions 263a and 263e thus form a double-sided wall which together provide springlike tension and additional support between the anode casing body 263 and abutting seal wall 270. This helps to maintain a tight seal between the anode and cathode casings. Alternatively, the side walls of the anode casing 240 can be formed as a single wall 263a without folded portion 263e. However, the anode casing 240 with the folded (double) side wall, as shown in the figures herein, has been determined to be desirable for very thin walled casing, for example, having a wall thicknesses between about 2 and 5 mil (0.0508 and 0.127 mm, which thickness ranges apply to each fold 263a and 263e. These thickness ranges also apply to the closed end 269 of the anode can. In the anode casing having a folded side wall (FIG. 1), the inner side wall portion 263a terminates in an inwardly slanted portion 263b which terminates in a second downwardly extending vertical portion 263c. The second straight portion 263c is of smaller diameter than straight portion 263a. The portion 263c terminates with a 900 bend forming the closed end 269 having a preferably flat negative terminal surface 265.

The body 242 of cathode casing 240 has a straight portion 242a of maximum diameter extending vertically downwardly from closed end 249. The body 242 terminates in peripheral edge 242b. The peripheral edge 242b of cathode casing 240 and underlying peripheral edge 273b of insulator ring 270 are initially vertically straight as shown in FIGS. 3 and 4 and can be mechanically crimped over the slanted midportion 263b of the anode casing 260 as shown in FIG. 5. Such crimping locks the cathode casing 240 in place over the anode casing 260 and forms a tightly sealed cell.

Anode casing 260 can be separately filled with anode active material 250 by first preparing a mixture of particulate zinc and powdered gellant material. The zinc average particle size is desirably between about 30 and 350 micron. The zinc can be pure zinc but is preferably in the form of particulate zinc alloyed with indium (100 to 1000 ppm). The zinc can also be in the form of particulate zinc alloyed with indium (100 to 1000 ppm) and lead (100 to 1000 ppm). Other alloys of zinc, for example, particulate zinc alloyed with indium (100 to 1000 ppm) and bismuth (100 to 1000 ppm) can also be used. These particulate zinc alloys are essentially comprised of pure zinc and have the electrochemical capacity essentially of pure zinc. Thus, the term "zinc" shall be understood to include such materials.

The gellant material can be selected from a variety of known gellants which are substantially insoluble in alkaline electrolyte. Such gellants can, for example, be cross linked carboxymethyl cellulose (CMC); starch graft copolymers, for example in the form of hydrolyzed polyacrylonitrile grafted unto a starch backbone available under the designation Waterlock A221 (Grain Processing Corp.); cross linked polyacrylic acid polymer available under the trade designation Carbopol C940 (B.F. Goodrich); alkali saponified polyacrylonitrile available under the designation Waterlock A 400 (Grain Processing Corp.); and sodium salts of polyacrylic acids termed sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO with added amount of pyrophosphate $(P_2O_7)^{4-}$ containing compound, typically comprising between about 0.004 and 12 wt. % of the electrolyte where wt. % of pyrophosphate additive is calculated based on $(P_2O_7)$ content, is added to the dry mixture of particulate zinc and gellant. The formed wet anode mixture 250 can then be inserted into the anode casing 260. Alternatively, the dry powder mix of particulate zinc and gellant can be first placed into the anode casing 260 and the electrolyte solution added to form the wet anode mixture 250.

A catalytic cathode assembly 230 (FIGS. 1 and 2) and air diffuser 231 can be inserted into casing 240 as follows: An air diffuser material 231 (FIG. 1), which can be in the form of an air porous filter paper or porous polymeric material can be inserted into the air inlet region 288 of the cathode casing 240 so that it lies against the inside surface of raised portion 244 of the casing against air holes 243. (Air inlet region 288 is the region underlying the air holes 243 and thus lies between the inside surface of cathode casing portion 244 and cathode assembly 230 including any electrolyte barrier layer 232 thereon. An adhesive sealant ring 143 is desirably applied to the inside surface 245*a* of recessed step 245 at the closed end of the cathode casing. A separate electrolyte barrier layer 232 (FIGS. 1 and 2), for example, of polytetrafluoroethylene (Teflon) which becomes a part of the cathode assembly 230 can optionally be inserted on the underside of the air diffuser material 231 so that the edge of the barrier layer 232 contacts adhesive ring 143. Barrier layer 232 is permeable to air but not permeable to the alkaline electrolyte or water. The adhesive ring 143 thus permanently bonds the edge of barrier layer 232 to the inside surface of recessed step 245. The adhesive ring 143 with barrier layer 232 bonded thereto prevents electrolyte from migrating from the anode to and around cathode catalytic assembly 230 and then leaking from the cell through air holes 243. A catalytic cathode assembly 230 as shown in FIG. 2 can be prepared as a laminate comprising a layer of electrolyte barrier material 235, a cathode composite disk 234 under the barrier layer 235 and a layer of ion permeable separator material 238 under the catalyst composite 234, as shown in FIG. 2. The separator 238 can be selected from conventional ion permeable separator materials including cellophane, polyvinylchloride, acrylonitrile, and microporous polypropylene. Each of these layers can be separately prepared and laminated together by application of heat and pressure to form the catalytic assembly 230. The electrolyte barrier layers 232 and 235 can desirably be of polytetrafluoroethylene (Teflon).

Catalytic cathode composite 234 desirably comprises a catalytic cathode mixture 233 of particulate manganese dioxide, carbon, and hydrophobic binder which is applied by conventional coating methods to a surface of an electrically conductive screen 237. Screen 237 may be of woven metallic fibers, for example, nickel or nickel plated steel fibers. The cathode mixture 233 is formed in the shape of a disk, which may be termed herein as the cathode disk. Other catalytic materials may be included or employed such as metals like silver, platinum, palladium, and ruthenium or other oxides of metals or manganese ($MnO_x$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The manganese dioxide in catalytic mixture 233 can also be manganese dioxide formed from the thermal decomposition of manganous nitrate $Mn(NO_3)_2$ or potassium permanganate $KMnO_4$. The carbon used in preparation of mixture 233 can be in various forms including graphite, carbon black and acetylene black. A preferred carbon is carbon black because of its high surface area. A suitable hydrophobic binder can be polytetrafluoroethylene (Teflon). The catalytic mixture 233 may typically comprise between about 3 and 10 percent by weight $MnO_2$, 10 and 20 percent by weight carbon, and remainder binder. During cell discharge the catalytic mixture 233 acts primarily as a catalyst to facilitate the electrochemical reaction involving the incoming air. However, additional manganese dioxide can be added to the catalyst and the cell can be converted to an air assisted zinc/air or air assisted alkaline cell. In such cell, which can be in the form of a button cell, at least a portion of manganese dioxide becomes discharged, that is, some manganese is reduced during electrochemical discharge along with incoming oxygen. The adhesive ring 143 is intended to be applicable for use as well in such air assisted cells to prevent leakage of electrolyte therefrom.

In the preferred embodiment (FIG. 1) the anode casing 260 has a layer of copper 266 plated or clad on its inside surface so that in the assembled cell the zinc anode mix 250 contacts the copper layer. The copper plate is desired because it provides a highly conductive pathway for electrons passing from the anode 250 to the negative terminal 265 as the zinc is discharged. The anode casing 260 is desirably formed of stainless steel which is plated on the inside surface with a layer of copper. Preferably, anode casing 260 is formed of a triclad material composed of stainless steel 264 with a copper layer 266 on its inside surface and a nickel layer 262 on its outside surface as shown in FIG. 1. Thus, in the final assembled cell 210 (FIG. 1) the copper layer 266 forms the anode casing inside surface in contact with the zinc anode mix 250 and the nickel layer 262 forms the anode casing's outside surface. The copper layer 266 desirably has a thickness between about 0.0002 inches (0.005 mm) and 0.002 inches (0.05 mm). The nickel layer is between about 0.0001 inches (0.00254 mm) and 0.001 inches (0.0254 mm).

By way of a specific non-limiting example, the cell size could be a standard size 312 zinc/air cell having an outside diameter of between about 0.3025 and 0.3045 inches (7.68 and 7.73 mm) and a height of between about 0.1300 and 0.1384 inches (3.30 and 3.52 mm). The anode 250 may include between about 2 and 5 wt. % mercury based on the weight of zinc, typically about 3 wt. % mercury based on the weight of zinc. Alternatively, the anode 250 may contain zero added mercury, namely less than 100 ppm based on weight of zinc (less than 100 parts by weight mercury per million parts by weight zinc), desirably the mercury content may be less than 40 ppm based on weight of zinc, typically less than 20 ppm mercury based on zinc. The anode 250 may have the following composition: zinc 77-83 wt % (the zinc can be alloyed with 200 to 1000 ppm each of indium and lead); aqueous alkaline electrolyte (34-40 wt % KOH and 2 wt % ZnO) 17-23 wt %; gelling agent (Waterlock J-550) 0.3 wt %. Desirably the aqueous electrolyte also comprises between about 0.004 and 12 percent by weight of pyrophosphate containing additive, where the weight percentage is calculated based on $(P_2O_7)$ content, preferably between about 0.012 and 6 percent by weight of pyrophosphate. Thus, the anode material 250 desirably comprises between about 0.001 and 2 percent by weight pyrophosphate, preferably between about 0.003 and 1 percent by weight of pyrophosphate $(P_2O_7)$.

Sufficient anode material 250 is supplied to fill at least about 75 percent of the internal volume of the anode casing 260, preferably between about 70 and 85 percent of the internal volume of the anode casing 260. The completed anode composition desirably has a zinc/electrolyte weight ratio between about 3.0 and 5.0, preferably between about 3.3 and 4.9, more preferably between about 4.0 and 4.9. In all cases the concentration of KOH in the aqueous electrolyte is between about 30 and 40 wt. %, preferably between about 33 and 40 wt. % and concentration of pyrophosphate in the electrolyte between about 0.004 and 12 percent by weight, preferably between about 0.012 and 6 percent by weight of ($P_2O_7$).

The cathode catalyst material 233 can have the following composition: Manganese oxides ($MnO_2$, $Mn_2O_3$, and $Mn_3O_4$) (4-15 wt. %), preferably between about 4 and 12 wt. %), carbon particles, preferably carbon black, between about 40-55 wt. %; and Teflon (polytetrafluoroethylene) particles between about 40-55 wt. %. (The manganese oxides may comprise any distribution of manganese oxides, such as ($MnO_2$, $Mn_2O_3$, and $Mn_3O_4$) and may also comprise MnO. Alternatively, the manganese oxides may be comprised of only $MnO_2$ particles.) A preferred composition for the cathode material 233 is as follows: Manganese oxides ($MnO_2$, $Mn_2O_3$, and $Mn_3O_4$) (6 wt. %); carbon black particles (51.5 wt. %) and Teflon binder (42.5 wt. %). The cathode material 233 may be compacted onto a nickel mesh or a nickel plated steel screen 237 to form cathode composite 234 (FIG. 2).

The adhesive sealant 143 can be applied as a continuous ring to the inside surface of the cathode casing recessed step 245. The adhesive 143 to be applied to the inside surface 245a of step 245 may be a solvent based mixture comprising a polyamide based adhesive component as described in U.S. Pat. No. 6,436,156 B1 and incorporated herein by reference. The adhesive component is thus desirably a low molecular weight thermoplastic polyamide resin. A preferred polyamide resin is available under the trade designation REAMID-100 or VERSAMID-100 (from Henkel Corp. or Cognis Corp.). REAMID-100 or Versamid-100 is a low molecular weight polyamide which is a gel at room temperature. It is as a dimerized fatty acid which is the reaction product of a dimerized fatty acid and diamine. The adhesive mixture may be formed by dissolving the REAMID-100 polyamide in a solvent of isopropanol 50 parts by weight and toluene 50 parts by weight. The polyamide adhesive layer 143 applied to the inside surface 245a of cathode casing step 245 provides a very strong bond between Teflon sheet 232 and the nickel plated cathode casing step 245. The adhesive 143 also has the advantage that it is resistant to chemical attack from the potassium hydroxide electrolyte.

Cell 210 can be assembled by first inserting the cathode components above described into the precrimped cathode casing 240. The air diffuser material 231 is inserted against air holes 42 within air inlet space 288. An electrolyte barrier layer 232, preferably of Teflon, is placed over the air diffuser material 231. Preferably the inside surface 245a of the cathode casing step 245 is coated with the above described adhesive 143 so that the edge of electrolyte barrier layer 232 adheres to the inside surface 245a of step 245. Preferably, the bottom surface (facing the cell interior) of the enlarged portion 273a of the insulating sealing disk 270 is also coated with a ring of an adhesive 144 as shown in FIG. 1. Adhesive 144 may have the same composition as adhesive 143. Although the adhesive layers 143 and 144 can be omitted, it is desirably included, particularly for cells having anode and cathode casing wall thickness which are very thin. For example adhesive layers 143 and 144 is desirably included for cells 210 having anode and cathode casing wall thicknesses between about 2.0 and 5 mils (0.0508 and 0.127 mm).

The anode casing 260 may be drawn to the shape shown in FIG. 1, for example, having straight side walls formed of an inner portion 263a which is folded over once to form outer portion 263e. Thus, in effect a double side wall is formed of inner wall 263a and outer wall 263e. It will be appreciated that the anode casing 260 may be formed of a single (unfolded) side wall instead of the double side wall 263a and 263e shown. The double side wall is preferred if the anode casing 260 has very thin side walls, for example, between about 2 and 5 mil 0.0508 and 0.127 mm). An insulator seal ring 270 is applied over the anode casing side walls. The anode casing 260 is then filled with anode material 250 above described.

The cathode casing body 242 is then pushed over the outside surface insulator 270. Crimping forces are applied to crimp edge 242b of cathode casing 240 over slanted surface 263b of the anode casing 260 with insulator edge 273b therebetween. Radial forces may be applied during crimping to assure a tight seal between the anode and cathode casings.

EXAMPLES

The following examples illustrate the benefit of adding even small amount of pyrophosphate based compound to the anodes of zinc/air button cells. Two types of comparative zinc/air button cells (size 312) were built (Control Cell A and Control Cell J). In Control Cell A the zinc particles in the anode were amalgamated with 3 wt. % mercury based on zinc, whereas Control Cell J had zero added mercury in the anode. The anode comprised zinc particles and aqueous electrolyte comprising potassium hydroxide (KOH) in concentration of about 35.3 wt. % with 2 wt. % ZnO. Neither Control A nor Control J cell contained any pyrophosphate based compound. The cells are built generally as above described and as shown in FIG. 1. The cathode assembly 230 comprised a cathode material 233 coated onto a nickel plated steel screen 237. The cathode material in the cells is of conventional composition. The cathode material was prepared by utilizing the well known permanganate process to form the manganese oxides as described, for example, in U.S. Pat. No. 4,433,035. In such method an aqueous solution of potassium permanganate and carbon particles are heated to a temperature between about 60 and 100° C. whereupon the permanganate is reduced by the carbon and manganese oxides are formed. The manganese oxides and carbon particles are then filtered and dried and mixed with additional carbon particles if desired to form the cathode. The manganese oxides which are formed in this manner comprise a mixture of $MnO_2$, $Mn_2O_3$, and $Mn_3O_4$. However, it will be appreciated that the manganese oxides may be added directly to the cathode material. The manganese oxides may also comprise only $MnO_2$ as is often used in conventional catalytic cathodes for zinc/air cells. The same cathode composition (composition below) was used in all of the control and test cells.

Test cells (312 size) were built. In one set of test cells, designated Test Cells A-1, the same anode composition (and same cathode) was used as in the Control Cell A, except that the aqueous potassium hydroxide electrolyte in the anode contained 1000 parts by weight potassium pyrophosphate ($K_4P_2O_7$) per million parts by weight electrolyte. In a second set of test cells (Test Cells A-2) the same anode composition (and same cathode) was used as in the Control Cell A, except that the aqueous potassium hydroxide electrolyte contained 300 parts by weight potassium pyrophosphate ($K_4P_2O_7$) per million parts by weight electrolyte. This is equivalent to 158 parts by weight $P_2O_7$ per million parts by weight electrolyte. The control cells A and test cells A-1 and A-2 were then subjected to the same performance tests (described below), and the service hours obtained are reported in Table 1.

Similarly, another group of test cells (312 size) were built. This set is designated Test Cells J-1. In test cells J-1 the same anode composition (and same cathode) was used as in Control Cell J, except that the aqueous potassium hydroxide electrolyte in the anode contained 1000 parts by weight potassium pyrophosphate ($K_4P_2O_7$) per million parts by weight electrolyte. The control cell J and test cells J-1 were then subjected to the same performance tests (described below), and the service hours obtained are reported in Table 2.

All the control and test cells had the following same cathode composition:

Catalytic Cathode Composition (all Cells)

|  | Wt. % |
|---|---|
| Manganese Oxides ($MnO_2$, $Mn_2O_3$, and $Mn_3O_4$) | 6.0 |
| Carbon particles Vulcan XC-72 (Cabot Corp.) | 51.5 |
| Binder particles Teflon (polytetrafluoroethylene) | 42.5 |
| Total | 100.0 |

The cathode material of above composition had a weight of between about 0.0094 to 0.013 grams which was compacted onto a nickel plated steel screen to form cathode composite 234 (FIG. 2).

The anode for each control and test cell had a total weight of solids (including gellant) of 0.2173 g plus aqueous alkaline electrolyte of 0.0473 g=0.2646 g.

Control Cell A

Anode Composition (Mercury Added):

|  | Wt., g. | Wt. % |
|---|---|---|
| Mercury added | 0.0065 | 2.46 |
| Lead | 0.0001 | 0.04 |
| Gellant (Waterlock J550) | 0.0007 | 0.26 |
| Zinc particles | 0.2100 | 79.36 |
| Aqueous Electrolyte (35.3 wt % KOH, 2 wt % ZnO) | 0.0473 | 17.88 |
| Total | 0.2646 | 100.00 |

Zinc/Electrolyte Ratio is 0.217/0.0473 = 4.58. (The weight of zinc, in calculating zinc/electrolyte ratio, includes the mercury.)

Test Cell A-1

Anode Composition (Mercury Added)
(1000 ppm Potassium Pyrophosphate Added to Electrolyte):

Same anode composition as in Control Cell A (above), except that electrolyte contained 1000 ppm potassium pyrophosphate ($K_4P_2O_7$) (parts by weight per million parts electrolyte). Thus the potassium pyrophosphate ($K_4P_2O_7$) comprised about 0.001×17.88=0.0179 percent by weight of the total anode composition. This is equivalent to 0.0094 percent by weight $P_2O_7$ of the total anode composition.

Test Cell A-2

Anode Composition (Mercury Added)
(300 ppm Potassium Pyrophosphate Added to Electrolyte):

Same anode composition as in Control Cell A (above), except that electrolyte contained 300 ppm potassium pyrophosphate ($K_4P_2O_7$) (parts by weight per million parts electrolyte). Thus the potassium pyrophosphate comprised about 0.0003×17.88=0.00536 percent by weight of the total anode composition. This is equivalent to 0.0028 percent by weight $P_2O_7$ of the total anode composition.

Control Cell J (Zero Added Mercury)

Anode Composition (Zero Added Mercury)

|  | Wt., g. | Wt. % |
|---|---|---|
| Added Mercury | 0.0 | 0.00 |
| Lead | 0.0001 | 0.04 |
| Indium | 0.0002 | 0.08 |
| Gellant (Waterlock J550) | 0.0007 | 0.26 |
| Zinc particles | 0.2163 | 81.75 |
| Aqueous Electrolyte (35.3 wt % KOH, 2 wt % ZnO) | 0.0473 | 17.87 |
| Total | 0.2646 | 100.00 |

Zinc/Electrolyte Ratio 0.2163/0.0473 = 4.57.

Test Cell J-1

Anode Composition (Zero Added Mercury)
(1000 ppm Potassium Pyrophosphate Added to Electrolyte):

Same anode composition as in Control Cell J (above) with zero added mercury, except that electrolyte contained 1000 ppm potassium pyrophosphate ($K_4P_2O_7$) (parts by weight per million parts electrolyte). Thus, the potassium pyrophosphate ($K_4P_2O_7$) comprised about 0.001×17.87=0.0179 percent by weight of the total anode composition. This is equivalent to 0.0094 percent by weight $P_2O_7$ of the total anode composition.

Performance Tests

The control cells A (without potassium pyrophosphate additive) and test cells containing potassium pyrophosphate ($K_4P_2O_7$), namely, test cells A-1 and A-2 were subjected to different discharge performance tests. These tests simulate normal usage of the cells, for example, as a power source for electronic hearing aids. The service life for each group of cells with respect to each test was obtained and is available for comparison in Table 1. Similarly, the control cells J (without added mercury and without potassium pyrophosphate additive) and test cells J-1 (without added mercury but containing potassium pyrophosphate additive), were subjected to different discharge performance tests. The service life for each group of cells with respect to each test was obtained and is available for comparison in Table 2.

The cells were subjected to two different discharge tests.

The first test is designated Proposed IEC HA test: The cells are discharged at 1.2 mAmp constant current for 2 hours followed by a 100 millisecond pulse of 5 mAmp current. The tests are repeated for six such 2 hour cycles (total 12 hours) and then followed by 12 hours rest. The complete cycle is repeated until a cut off voltage of 1.05 Volts is reached.

The second test is designated Proposed IEC HRHA test: The cells are discharged at a higher rate of 2 mAmp constant current for 2 hours followed by a 100 millisecond pulse of 10 mAmp current. The tests are repeated for six such 2 hour cycles (total 12 hours) and then followed by 12 hours rest. The complete cycle is repeated until a cut off voltage of 1.05 Volts is reached.

The above discharge tests were applied to a) fresh cells, b) after the cells were subjected to elevated temperature cycling "pre TTC" between 25° C. and 55° C. for 2 weeks, and c) cells which were first stored for 3 months at ambient temperature (3 month prestorage at ambient). The test results are reported in Tables 1 and 2.

TABLE 1

TEST ZINC/AIR CELLS HAVING POTASSIUM PYROPHOSPHATE COMPARED WITH CONTROL CELLS[1]

| | Fresh Cells Prop. IEC HA Test[2] Service Hrs. | Prop. IEC HA Test (pre TTC) Service Hrs. | Prop. IEC HRHA Test (pre TTC) Service Hrs. | Prop. IEC HA Test 3 months ambient prestorage Service Hrs. | Prop. IEC HRHA Test 3 months ambient prestorage Service Hrs. |
|---|---|---|---|---|---|
| Control[3] Cells A (Zero $K_4P_2O_7$) | 141.2 | 130.8 | 75 | 123.9 | 74.7 |
| Test[4] Cells A-1 1000 ppm ($K_4P_2O_7$) | 144.2 | 132.8 | 76.8 | 125.2 | 75.5 |
| Test[5] Cells A-2 300 ppm ($K_4P_2O_7$) | 144.8 | 135 | 76.8 | 124.1 | 76.2 |

Notes:
[1]The anodes of all cells in Table 1 contained 3 wt. % mercury based on zinc.
[2]See text preceding tables for description of the discharge tests (Proposed IEC HA and Proposed IEC HRHA and prestorage of cells at elevated temperature (TTC).
[3]Control Cells A did not contain any potassium pyrophosphate ($K_4P_2O_7$) additive in the anode.
[4]Test cell A-1 had 1000 ppm potassium pyrophosphate ($K_4P_2O_7$) added to the alkaline electrolyte in the anode.
[5]Test cell A-2 had 300 ppm potassium pyrophosphate added to the alkaline electrolyte in the anode.

TABLE 2

TEST ZINC/AIR CELLS HAVING POTASSIUM PYROPHOSPHATE COMPARED WITH CONTROL CELLS (ALL CELLS HAD ZERO ADDED MERCURY)[1]

| | Fresh Cells Proposed IEC HA Test[2] (Service Hrs.) | Proposed IEC HA Test (pre TTC) (Service Hrs.) | Proposed IEC HRHA Test (pre TTC) (Service Hrs.) | Proposed IEC HA Test 3 months ambient prestorage (Service Hrs.) | Proposed IEC HRHA Test 3 months ambient prestorage (Service Hrs.) |
|---|---|---|---|---|---|
| Control[3] Cells J (Zero $K_4P_2O_7$) | 124.9 | 120.4 | 70.6 | 120.6 | 65 |
| Test[4] Cells J-1 1000 ppm ($K_4P_2O_7$) | 127.2 | 123.2 | 72.7 | 121.9 | 67.8 |

Notes:
[1]The anodes of all cells in Table 2 were mercury free (contained zero added mercury).
[2]See text preceding tables for description of the discharge tests (Proposed IEC HA and Proposed IEC HRHA) and prestorage of cells at elevated temperature (TTC).
[3]Control Cells J did not contain any potassium pyrophosphate ($K_4P_2O_7$) additive in the anode.
[4]Test cell J-1 had 1000 ppm potassium pyrophosphate ($K_4P_2O_7$) added to the alkaline electrolyte in the anode.

As may be seen from inspection of the test results reported in Table 1, all of the test zinc/air cells with added potassium pyrophosphate additive in the anode showed better performance results, as measured in greater service hours, than the control cell without the potassium pyrophosphate in the anode. Similarly, all the mercury free test cells reported in Table 2, which had added potassium pyrophosphate additive in the anode, showed greater service hours than the control cell without the potassium pyrophosphate. The addition of the potassium pyrophosphate did not visibly promote any cell leakage and in fact there was no visible cell leakage during or at the conclusion of any of the above tests.

Although the invention has been described with reference to specific embodiments, it should be appreciated that other embodiments are possible without departing from the concept of the invention. Thus, the invention is not intended to be limited to the specific embodiments but rather its scope is reflected by the claims and equivalents thereof.

What is claimed is:

1. A primary (non-rechargeable) cylindrical zinc/air cell comprising an anode and a cathode; said anode comprising an anode material comprising zinc particles, pyrophosphate $(P_2O_7)^{4-}$ based additive comprising potassium pyrophosphate ($K_4P_2O_7$), and aqueous alkaline electrolyte comprising potassium hydroxide having a concentration of between 30 and 40 percent by weight.

2. The cell of claim 1 wherein the anode material comprises between about 0.001 and 2 percent by weight of pyrophosphate based additive calculated based on ($P_2O_7$) content.

3. The cell of claim 2 wherein said anode material comprises between about 77 and 83 percent by weight zinc and between about 17 and 23 percent by weight of said alkaline electrolyte.

4. The cell of claim 2 wherein the zinc/electrolyte weight ratio in said anode is between about 3.3 and 4.9.

5. The cell of claim 4 wherein said alkaline electrolyte comprises potassium hydroxide having a concentration therein of between about 33 and 40 percent by weight.

6. The cell of claim 1 wherein said cell comprises less than 100 parts by weight mercury per million parts by weight zinc.

7. The cell of claim 1 wherein said cylindrical cell comprises a form, wherein the form is selected from the group consisting of: AAAA, AAA, AA, C, and D sizes.

* * * * *